Patented Dec. 2, 1941

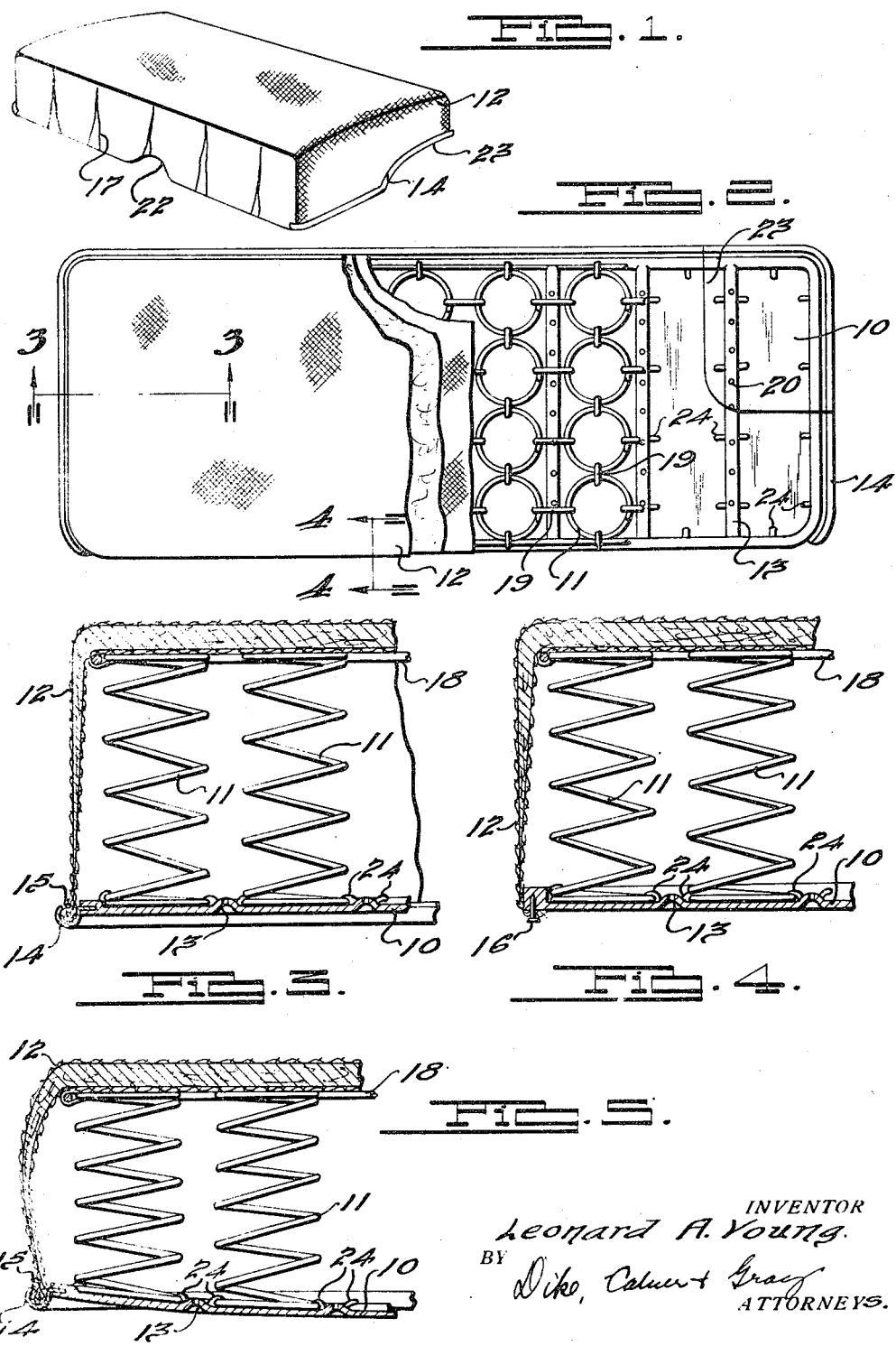

2,264,352

UNITED STATES PATENT OFFICE 2,264,352

SEAT CONSTRUCTION

Leonard A. Young, Detroit, Mich.

Application October 31, 1938, Serial No. 237,805

2 Claims. (Cl. 155—179)

The present invention relates to improvements in a resilient seat construction.

It is an object of the present invention to provide an improved resilient seat construction in which the improved riding qualities insure greater comfort to the user.

Another object of the invention is to provide an improved resilient seat construction in which air pressures within the seat are utilized to control the resiliency of the seat construction.

A further object of the invention is to provide an improved resilient seat construction in which a solid continuous resilient base member is employed as a common support for all the individual spring units.

A still further object of the invention is to provide an improved resilient seat construction in which a shaped continuous solid base member of a predetermined contour is provided and thus provides a seat construction which closely fits the seat opening, such for example as that provided in a vehicle body.

Other objects of this invention will appear in the following description and appended claims, reference being had to the accompanying drawing forming a part of this specification wherein like reference characters designate corresponding parts in the several views.

The present invention may be used in various types of resilient seat constructions such for example as seats in vehicle bodies and in the formation of bed springs, and in general any upholstered resilient seat construction.

The invention is illustrated by way of example but not of limitation in the accompanying drawing showing the invention as applied to the construction of a resilient seat adapted for use in motor vehicle construction.

Fig. 1 is a view in perspective of an upholstered resilient seat embodying the present invention.

Fig. 2 is a top plan with parts broken away of the seat construction shown in Fig. 1.

Fig. 3 is a sectional view taken substantially on the line 3—3 of Fig. 2 in the direction of the arrows.

Fig. 4 is a sectional view taken substantially on the line 4—4 of Fig. 2 in the direction of the arrows.

Fig. 5 is a view similar to Fig. 3 and showing the spring units in a partially compressed condition.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

While the seat shown in the accompanying drawing is particularly adapted to provide an upholstered resilient seat construction for use in motor vehicles, it is to be definitely understood that the invention is not thereby limited to this use, although many of the features of the present invention make the invention particularly adaptable for use in this field.

Referring to the drawing, a resilient seat construction embodying the present invention consists essentially of a base member 10, a plurality of resilient spring units 11, and the upholstering material and cover 12. The base member 10 is preferably formed from a continuous sheet of yielding imperforate material, such for example as a molded plastic material or the like, which in a solid sheet-like form possesses a resilient quality which permits it to yield under the loads imposed thereon and to return to its normal condition upon release of such loads. The bottom entraps air within the seat construction and the air cushion thus formed checks or modifies and supplements the resiliency of the springs 11. In addition, the base member 10 resiliently opposing the loads imposed thereon, yields to the forces transmitted thereto by the spring units 11. Thus the action of the spring units 11 is not only modified by the entrapped air within the seat, but also is modified by the resilient yielding of the base member 10 which prevents collapse of the spring units under normal load conditions.

In the construction here shown the base 10 is preferably formed of a continuous sheet of a molded plastic substance which preferably is provided with a plurality of reinforcing ridges 13 which may extend either transversely of the seat as here shown or may extend longitudinally of the seat. If desired, the ridges 13 may extend both longitudinally and transversely of the seat and thus provide a series of separate pockets into which the base portions of the springs 11 may be received.

Each of the reinforcing ridges has a plurality of ports 20 formed therein which communicate with the interior of the cushion and with the hollow portions of the reinforcing ridges 13. The ports 20 and the ridges 13 thus provide a duct system which permits a predetermined controlled exhausting of the air from the cushion and a controlled intake of air into the cushion. The control is effected by regulating the number and size of the ports 20 and the size of the hollow portions of the ridges 13. The hollow portions of the ridges 13 open to the atmosphere and thus act as ducts for conveying air to or from the interior of the cushion.

In an embodiment of the invention here shown, a metal rim 14 which originally is of substantially U-shape is molded into the two sides and back portion of the base member 10 and provides a member which may be deformed to clamp the side and back marginal edges of the upholstering material and cover 12. As shown in Fig. 3, the edge portion of the upholstering material 12 is preferably folded as at 15 and forced into the channel in the member 14. The member 14 is bent, thus changing the shape of the channel and clamping the edge of the upholstering material securely therein. It is to be understood, however, that any desired type of upholstery securing devices may be used instead of the rim 14, as for example spaced clips, clamps, prongs, or the like.

Extending along the front edge of the base 10 is a tacking rim or strip 16 which, as shown in Fig. 4, is molded as an integral part of the base member 10. This tacking strip is so formed as to permit the driving of upholstery tacks thereinto and to hold such tacks against removal. However, the tacking rim may be dispensed with in the event that it is desired to secure the upholstery material directly to a structural part of the vehicle body.

In forming the base member 10 of a molded plastic sheet, the tacking rim 16, if provided, preferably has a lesser density than the body portion of the member 10. Such a construction will result by subjecting the rim portion 16 to lesser pressure during the molding operation than that to which the other portions of the base 10 are subjected. In the event that it is not desired to form the tacking strip 16 as an integral part of the base member 10, a strip of any suitable tacking material, such for example as wood, compressed paper, plastic, or the like, may be secured to the base 10 in any desired manner.

In view of the fact that in the conventional type of construction the front edge of the upholstering material and cover 12 is preferably provided with pleated portions 17, it is desirable that at least the front portion of the base 10 be provided with the tacking rim required to accommodate the tacking of the forward edge of the upholstering material and cover thereto if the seat is designed to be removable as a unit relative to the vehicle. It is not necessary to provide such a strip if the seat is not intended to be removable from the vehicle. It is to be understood, however, that the tacking rim similar to the tacking rim 16, if desired, may be provided on all four sides of the bottom and that the upholstering material and cover may be secured to the tacking rim on all four sides of the base 10. It is also to be understood that in certain types of seat constructions the rim 14 or other types of upholstery securing devices may be provided around all four sides of the base 10 and the upholstering material 12 thus be secured to all four sides of the seat without the use of tacks or tacking strips.

In the construction here shown the resilient spring units are of the coil spring type and are attached to the base 10 in any desired manner, as for example by clips 24 connected with the base of the springs and secured to the base member 10. The clips 24 are preferably metal inserts molded in the base 10 and bent over the base portions of the spring units in order to hold the springs against movement relative to the base or relative to each other.

The top portions of the spring units 11 are connected by means of a top rim 18, which is secured to the springs as by clips or in any other desired manner. In addition, the tops of the springs may be united with one another through a plurality of connecting links 19 which may be either plain wire of small coil springs so that the yielding of any single spring 11 to a force imposed thereon is partially transmitted to adjacent springs so that the load is carried in each instance by a plurality of springs and is transmitted by such plurality of springs to the base member 10. Due to the yielding nature of the base member 10, complete collapse of the springs 11 due to the imposition of a sudden and extreme load thereon is largely prevented.

As will be seen from the construction described, air is entrapped in the seat by the base member 10 and the upholstered covering 12. Any compression of the springs 11 is therefore cushioned by such entrapped air. As the air is compressed, it will be forced out of the seat chiefly through the ports 20 and the ridges 13 and partly through the upholstering material 12. This exhausting of the air will occur at a controlled rate which is relatively slow so that the seat has all the cushioning effect of an air cushion. The rate of exhaustion of the air is controlled by the number and sizes of the ports 20 and ridges 13 and the perforate nature of the upholstering material and cover 12. If the rate of exhausting of the air through the upholstered covering is sufficiently high, it may not be necessary to use the ports 20 to exhaust the air through the base member 10. Also, if desired, as where the base 10 is placed in intimate contact on the surface and around its edges with an air-tight surface, ventilators of any desired type may be used in the upholstering material to permit a controlled flow of air to or from the interior of the cushion.

As shown in Fig. 1, the base member 10 may be of any desired configuration to adapt the seat to fit in the desired seat compartment. When used as the rear seat in a motor vehicle construction, it frequently is necessary to provide a contoured portion 22 which will extend over the propeller shaft tunnel frequently employed in motor vehicle constructions, and to provide a contoured portion 23 to permit the seat to fit around the wheel housing commonly provided in a motor vehicle body. This achieves a substantial economy in construction over conventional structures which employ a metal framework which must be bent to the desired shape and contour.

From the foregoing it will be seen that I have provided an improved type of resilient seat in which provision is made for trapping and utilizing air within the seat for modifying the resilient characteristics of a plurality of spring units. In addition, the construction provides a continuous sheet-like resilient bottom acting as a common support for the spring units. As will be seen, the rate of exhausting the air from the seat may be controlled and thus effect a control over the riding quality of the seat construction embodying the present invention.

I claim:

1. A resilient seat construction comprising a plurality of connected resilient spring units secured to a yieldable and relatively resilient base member formed from a sheet of molded plastic material, a plurality of integral parallel ridges of substantially arch-shaped cross section formed in said base member providing flat base portions therebetween upon which the inner ends of said spring units seat, a plurality of metal inserts molded in said plastic base and having bendable portions extending above the inner surface of the base and grippingly engaging said inner ends of said spring units, and an upholstered covering enclosing the spring units and secured to the marginal edge portions of said base member.

2. A resilient seat construction comprising a plurality of connected resilient spring units secured to a yieldable and relatively resilient base member formed from a sheet of molded plastic material, a plurality of integral parallel ridges of substantially arch-shaped cross section formed in said base member providing flat base portions therebetween upon which the inner ends of said spring units seat, a plurality of metal inserts molded in said plastic base and having bendable portions extending above the inner surface of the base and grippingly engaging said inner ends of said spring units, said base member having integrally formed and thickened marginal edge portions, and a covering for said spring units attached at its edge to the said thickened marginal edge portions of said base member to provide with the base member means for completely enveloping the spring units.

LEONARD A. YOUNG.